United States Patent [19]
Jeng et al.

[11] Patent Number: 5,848,845
[45] Date of Patent: Dec. 15, 1998

[54] CONFIGURATION OF LUBRICATION NOZZLE IN HIGH SPEED ROLLING-ELEMENT BEARINGS

[75] Inventors: Yeau-Ren Jeng, Tainan; Cheng-Chang Ling, Chia-Yi; Chih-Chung Gao, Taipei, all of Taiwan

[73] Assignee: National Science Council, Taipei, Taiwan

[21] Appl. No.: 870,418

[22] Filed: Jun. 5, 1997

[51] Int. Cl.⁶ ..................................................... F16C 33/66
[52] U.S. Cl. ........................... 384/466; 384/468; 184/6.26
[58] Field of Search .................................... 384/462, 468, 384/471, 473, 466; 184/6.26, 6.22

[56] References Cited

U.S. PATENT DOCUMENTS

| | | | |
|---|---|---|---|
| 3,939,944 | 2/1976 | Mitchell et al. | 184/6.26 |
| 4,006,944 | 2/1977 | Ando et al. | 384/466 |
| 4,057,371 | 11/1977 | Pilarczyk | 417/409 |
| 4,137,997 | 2/1979 | Ando | 184/6.22 |
| 4,342,489 | 8/1982 | Lenz et al. | 384/465 |
| 4,343,378 | 8/1982 | Bremer | 184/6.26 |
| 4,759,427 | 7/1988 | Onose et al. | 384/466 X |
| 4,785,913 | 11/1988 | Maurer et al. | 184/6.26 |

FOREIGN PATENT DOCUMENTS

| | | | |
|---|---|---|---|
| 2703749 | 8/1978 | Germany | 384/471 |

*Primary Examiner*—Thomas R. Hannon
*Attorney, Agent, or Firm*—Beveridge, DeGrandi, Weilacher & Young, LLP

[57] ABSTRACT

A configuration of lubrication nozzle including a large flow path to connect external oil supply tube with semi-circle cross section annular flow path, and three jet flow conduits with L form having interval of 120° between adjacent channels to link annular flow path and outlet is created for oil-air or oil-mist lubrication system for high speed rolling-element bearings.

4 Claims, 3 Drawing Sheets

5,848,845

CONFIGURATION OF LUBRICATION NOZZLE IN HIGH SPEED ROLLING-ELEMENT BEARINGS

BACKGROUND OF THE INVENTION

Field of the Invention

This invention relates to a configuration of a lubrication nozzle for oil-air or oil-mist lubrication systems in high speed rolling-element bearings.

BACKGROUND OF THE INVENTION

The operating performance of a rolling bearing is closely related with the lubrication system. A good lubricating system can increase the revolution of the bearing, extend the life of the bearing, and also, considerably help in reducing the power consumption of the whole system. Lubrication systems used for rolling bearings include grease, oil injection, oil-mist, and oil-air. In grease lubrication, the bearing is lubricated with high viscosity lubricating grease. While the bearing is rolling, grease spreads evenly on the surface to be lubricated. Since heat dissipation of lubricating grease is poor, it is only applicable in medium and low revolution rolling bearings.

Heat dissipation of bearings is a major concern in increasing the maximum revolution of bearings. Most of the high speed rolling bearings were damaged due to poor heat dissipation. There are two lubricating systems currently used for high speed rolling bearings. One is by injecting low viscosity lubricating oil directly into the bearing, then the lubricating oil is cooled and filtered such that a circulating injection oil system is formed. This is the so-called oil injection lubricating system. Although this system can achieve very high revolutions, the cost is high and power consumption is large. In addition, oil seal should be considered in the space it occupies.

Therefore the other method, mixing air with lubricating oil, is more popular. Oil-air and oil-mist lubrication systems are this method of lubrication. In these two lubricating systems, high compressed air carrying a specific quantity of lubricating oil is injected directly into the bearings to be lubricated.

Oil-air system and oil-mist system have different methods in generating mixture. It's basic difference is that in an oil-air system, lubricating oil and high compressed air flow into a mixed unit through two independent channels, then the force of high compressed air carries the lubricating oil crawling inside the delivery channel. Then the two are injected directly into the bearing to be lubricated. As to oil-mist, high compressed air flows into the Venturi tube. Then the pressure difference generated inside the Venturi tube mixes the lubricating oil and air and forms an oil-mist.

To deliver lubricating oil more accurately to the lubricating point, a lubricating nozzle is sometimes connected on the end of delivery channel. Then the small caliber of nozzle will generate a small area of lubricating oil supply surface and sufficient acceleration to achieve precision lubricating of bearings. Because oil injection lubricating systems need more complicated configuration in designing a nozzle, and also requires bigger power consumption, this invention mainly focused on the design of oil-air and oil-mist lubricating nozzle.

Most of the design of nozzle in high speed rolling bearings is single-spot or double-spot lubricating system. That is, one bearing uses one or two nozzles for lubrication. This design easily causes uneven heat dissipation. As a result, there is an uneven temperature distribution in the bearing. So the bearing is deformed due to the heat and a result is precision loss. At the same time, it will generate stress concentration in the bearing and reduce the service life of bearing. Since the nozzle is near the bearing, the heat radiated from the bearing is transferred to the nozzle. If lubricating oil is deposited inside the nozzle due to the design of the nozzle flow path, the lubricating oil deposit will cause an unnecessary temperature rise and an oil capacity variation to the whole system. If it was used in connection with a spindle (motor is installed within spindle), temperature rise will be even more critical.

The volume of air flow greatly affects the cooling of bearings. Oil-air and oil-mist lubricating systems rely on large volumes of air to cool the bearing. If the nozzle can inject maximum air under a specific pressure condition, there will be no interference in the lubricating oil supply to the lubricating point, and is definitely helpful in increasing the cooling and revolution of the bearings.

Based on the above discussion, the design of lubricating nozzle in bearings should be able to increase the heat dissipation efficiency in the bearings, balance temperature rise in bearings, and prevent internal deposits of oil, which are the problems that shall be solved by this Invention.

Description of the prior art

The principle of oil-air lubricating was applied in the lubricating mechanism of "Spindle Lubricating System" exposed in U.S. Pat. No. 4,785,913. The lubricant injector was controlled by a timer, injecting lubricant into the designed mixed oil-air mechanism at a set time, then the force of compressed air led the lubricant into the nozzle and lubricated the main shaft bearing.

Since this oil-air lubricating system is an interval oil supply system, it was disclosed that when the lubricant was led into the mixed mechanism, it adheres to the spring, the rolling ball, and the screw thread. When compressed air entered this mixed mechanism, it gradually carries these adhered lubricants away. So, lubrication is more continuous. Actually, due to the reasons mentioned above, it will generate oil capacity variations in the oil-air lubricating system. Therefore, the device of this U.S. Patent is not ideal. Stability in oil supply can be improved by increasing the viscosity of lubricant, selecting a proper length of oil supply tube, reducing the oil injection capacity each time, and shortening the oil injection interval.

The design of lubricating system exposed in U.S. Pat. No. 4,057,371 "Gas Turbine Driven High Speed Centrifugal Compressor Unit" was intended for a journal bearing. Mainly, the lubrication principle of the journal bearing was to inject high pressure lubricant between the rotary shaft and the bearing through an oil supply pump. When the main shaft rotates, it will generate a wedge effect between the main shaft and the bearing. Now, the lubricant will generate a positive pressure between the main shaft and the bearing to lubricate the main shaft and the bearing separately. The whole process of lubrication was completed in one cycle. Hence, lubricant flowing out from the journal bearing can flow back into the oil box for continuous use, in which there was a cooling mechanism controlling the lubricant at an appropriate temperature.

Aside from these there are R.O.C. Pat. No. 71,973 "Mist Cooling Lubrication Device", R.O.C. Pat. No. 154,639 "Emergency Mist Lubricating System", and the U.S. Pat. No. 3,939,944 "Oil-Mist Lubrication System", U.S. Pat. No. 4,137,997 "Lubricating and Cooling System for Spindle Bearing Assembly", U.S. Pat. No. 4,006,944 "Spindle Device Having Bearings Lubricated with Oil Jet", U.S. Pat. No. 4,284,171 "Emergency Oil/Mist System", U.S. Pat. No. 4,342,489 "Bearing Lubricating Injector", U.S. Pat. No. 4,759,427 "Nozzle Assembly of A Constant Fine Lubrication Device", and U.S. Pat. No. 4,343,378 "Method and Apparatus for Lubricating Bearings" concerning various aspects of designs of oil-air, oil mist, and oil injection lubricating systems. However, these patents were all different from the design of this invention.

SUMMARY OF THE INVENTION

This invention concerns the configuration of a lubricating nozzle in high speed rolling-element bearings. It's main purpose is to improve the former designs of the nozzle, to assist lubricating oil-air or oil-mist to get into the lubricating point in the bearing accurately, to balance heat dissipation of bearing, and to prevent oil deposit in the flow path.

Rolling-element bearings are currently being commonly applied in high speed rotating systems due to their low friction, small run out, (i.e., high rotating accuracy) and high rigidity. However, the lubrication technique is the key to achieve high revolution requirements in this type of bearing.

Oil-air and oil-mist systems are popular lubrication systems used for high speed rolling-element bearings. It's DN value can reach $1.2 \times 10^6$ and above. The DN value is multiplication of pitch diameter of the bearing (mm) and revolution (rpm). In addition to the operating parameters of the lubricating system, the shape of nozzle, the flow path design, the position and quantity of the nozzle jet are also important factors to increase the revolution of the bearing and to extend its service life.

In view of this purpose, the followings were taken into account in the invention of this lubrication nozzle:

1. Even distribution of bearing temperature.
2. Prevention of oil deposits inside the flow path.
3. Large supply of cooling air.
4. Lubricating oil-air or oil-mist can enter the bearing accurately without interference.

BRIEF DESCRIPTION OF THE DRAWINGS

Detailed drawings of the configuration and functions of this invention are as follows.

REFERENCE NUMBER OF THE ATTACHED DRAWINGS 1, 2, 3 . . . Ball bearing
4, 5, 6 . . . Lubrication nozzle (annular spacer)
7 . . . Cored circular column
8 . . . (Large caliber) flow path
9 . . . Semi-circle annular flow path
10, 11, 12, 13, 14, 15 . . . Injection oil channel

DETAILED DESCRIPTION OF THE INVENTION

The design of lubrication nozzle device in the patent application of "A Configuration of Lubricating Nozzle in High-Speed Rolling-element Bearings" is intended for high-speed rolling-element bearings. It is used only in oil-air or oil-mist lubricating system.

This invention is a configuration of lubrication nozzle in high-speed rolling-element bearings. Provided is a large flow path to connect with the external oil supply tube. Then a semi-circle cross section annular flow path is connected with the large flow path and has three jet flow conduits with an L-shape form disposed at intervals of 120° between adjacent channels to link the annular flow path and the outlet. The large flow path connecting the external oil supply tube is drilled to fix the bearing and cored circular column used for preload. The semi-circle cross section annular flow path and the three jet flow conduits which are disposed at intervals of 120° between adjacent channels to the annular flow path and the nozzle outlet are fixed on the circle of T-sectional area curve of the bearing and bearing spacer.

In the above mentioned configuration, the range of jet flow conduits inlet caliber is 2.0 mm to 3.0 mm and the range of outlet caliber is restricted to 2.0 mm and below. The large flow path which was drilled on the cored circular column for preload should be larger than the caliber of external oil supply tube and smaller than the diameter of the semi-circle cross section annular flow path.

The DN value (multiplication of pitch diameter of bearing and revolution) of the rolling-element bearings in the configuration of lubrication nozzle in high-speed rolling-element bearing is restricted to $2.0 \times 10^6$.

Figure 1:
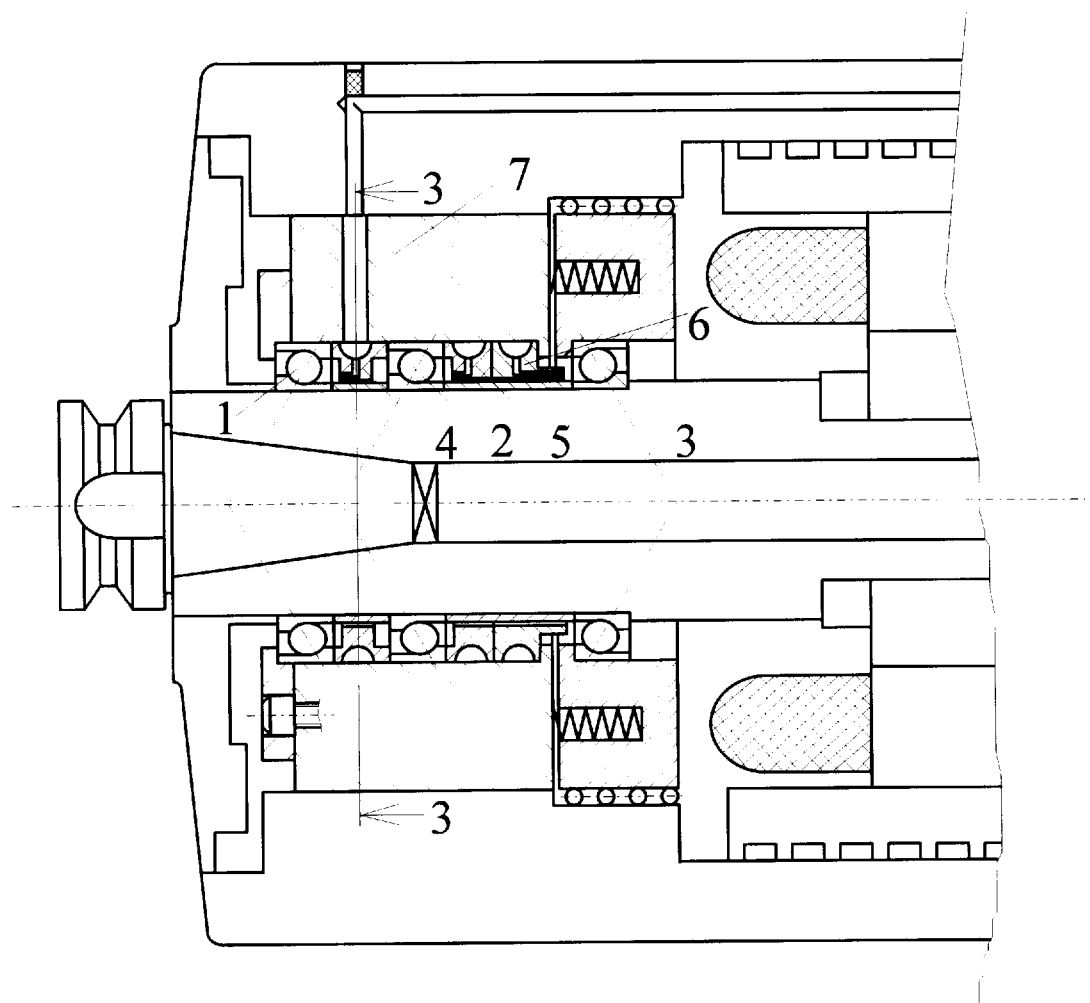
FIG. 1. Partial View of the Invention Applied to lubrication systems for bearings of built-in-high-speed spindle in tool machine.

FIG. 1 is the partial view of the invention as it is applied in built-in high-speed spindle in a tool machine. Ball bearings 1, 2, and 3 are separately lubricated through lubricating nozzles of rings 4, 5, and 6. The design principle of the internal flow path of each of nozzles 4, 5, and 6 is totally identical.

Figure 2:
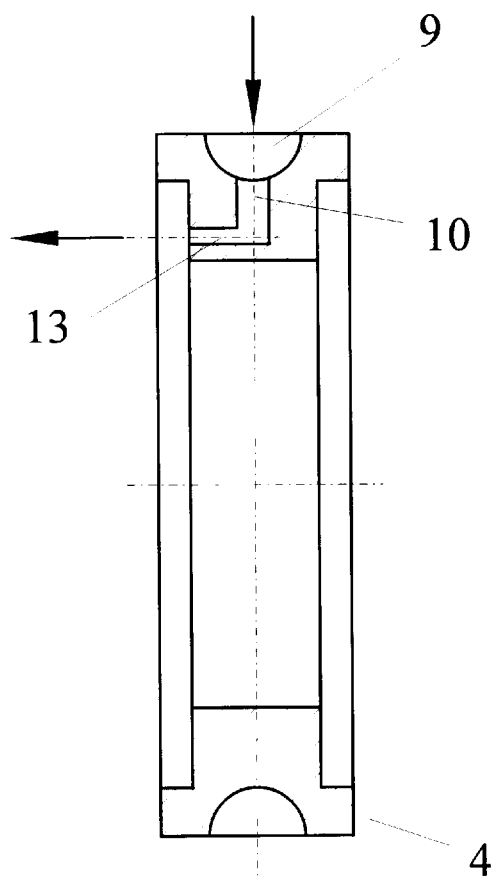
FIG. 2. Side Sectional View of the Ring of T-sectional Area Curve Between Bearing and Bearing Spacer in FIG. 1.

FIG. 2 is the sectional view of the side of the ring 4 of T-sectional area curve between bearing and bearing spacer in FIG. 1. Oil injection tubes 10 (and 11, 12, see FIG. 3) and 13 (and 14, 15, see FIG. 3) are perpendicular to each other. Tube diameter turns from big to small causing the lubricating oil-air or oil-mist to accelerate and then inject on the lubricating point with high speed. The small caliber of the oil injection channel may allow oil-air or oil-mist to breakthrough the air flow block outside the bearing, but only up to certain limit. Therefore, the range of the caliber of oil injection tube 10 (11, 12) is set at between 2.0 mm to 3.0 mm while the caliber of oil injection tube 13(14, 15) should be less than 2.0.

Figure 3:
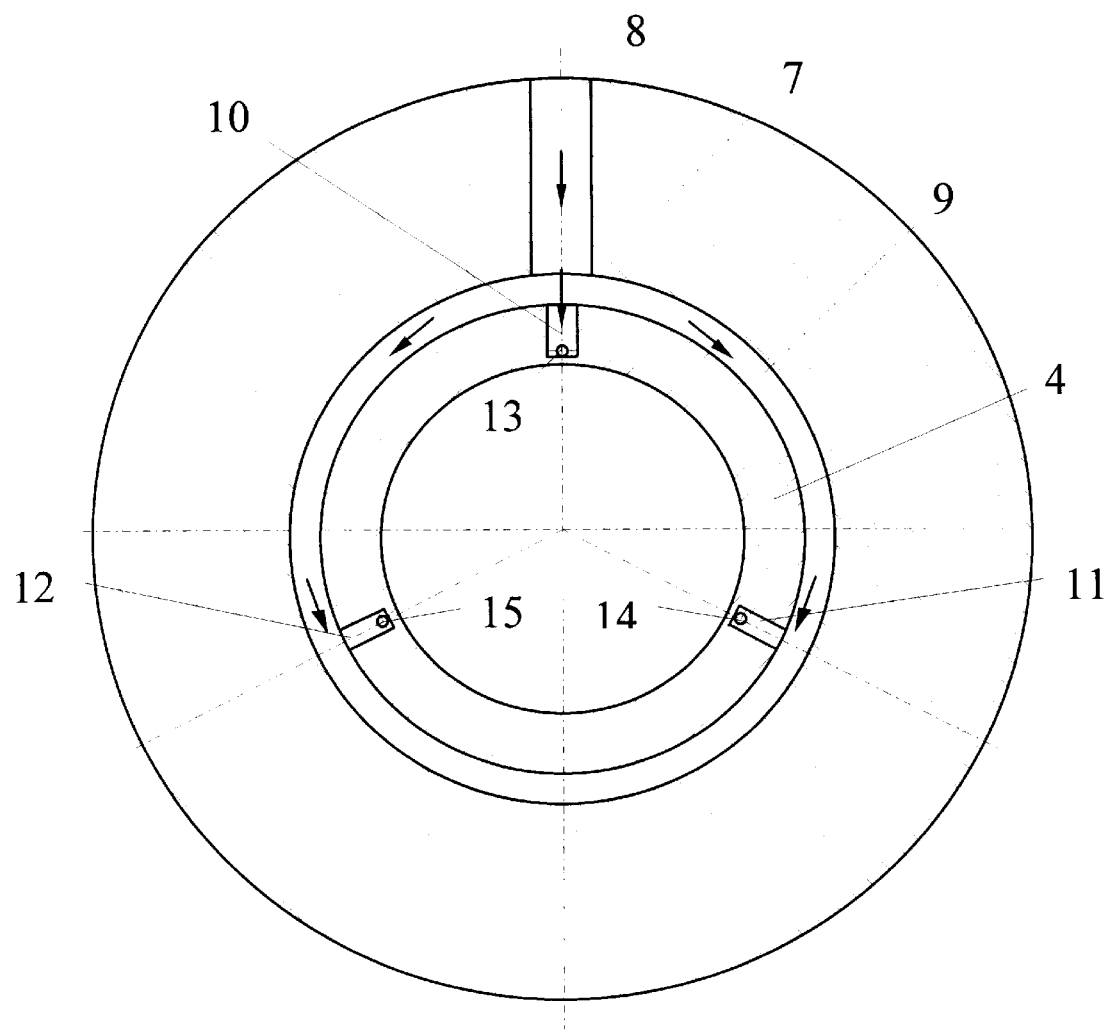
FIG. 3. Sectional View of III—III Across Section, the front sectional View of the Whole Lubrication Nozzle.

FIG. 3 is the front sectional view of the whole lubrication nozzle, which is the III—III cross section in FIG. 1. A large flow path 8 is drilled inside the cored circular column 7 for fixing bearing and preload, and connects the external oil supply tube of oil-air or oil-mist to the semi-circle cross section annular flow path 9. It's caliber should be larger than the external supply tube and smaller than the diameter of semi-circle cross section annular flow path 9 to prevent oil deposits at the joint. The surface of T-sectional area curve of bearing and bearing spacer's ring 4 located at the semi-circle cross section annular flow path is round and smooth so that oil-mist or oil-air can flow evenly into the three jet flow conduits 10, 11, 12 which have an interval of 120° between annular channels. Originally, semi-circle cross section annular flow path 9 can be designed on the inner wall of the cored circular column 7 for fixing bearing and for preload. But taking into account the difficulty in machining outer circle and inner circles, this flow path is designed on the surface of the circle 4 of T-sectional cross area of the bearing and bearing spacer.

The feature of this invention is that the flow path is designed for the oil-air or oil-mist supply tube to turn from the small flow, to large flow semi-circle cross section annular flow path, and three jet flow conduits. It can effectively drop the temperature rise of bearings, minimize stress concentration due to uneven heat deformation, minimize oil supply variation due to internal oil deposits, and temperature rise inside the nozzle, and at the same time increase the speed of bearing revolution and extend the service life of the bearing.

What is claimed is:

1. A configuration of a lubrication nozzle for use with high-speed rolling-element bearings, comprising:

a large flow path for connection with an external oil supply tube;

a semi-circle cross section annular flow path in communication with said large flow path; and three jet flow conduits each having an L-shaped form and disposed at annular intervals of 120° therebetween, said annular flow path being in communication with said three jet flow conduits, wherein said large flow path is defined in a cored circular column defining a cored inner chamber, and said semi-circle cross section annular flow path and said three jet flow conduits are included on an annular ring member located within said cored inner chamber.

2. The configuration of a lubrication nozzle as defined in claim 1, wherein a range of an inlet caliber of each jet flow conduit is 2.0 mm to 3.0 mm and a range of an outlet caliber of each jet flow conduit is restricted to 2.0 mm and below, and the large flow path defined in said cored circular column is larger than the caliber of an external oil supply tube and smaller than a diameter of said semi-circle cross section annular flow path.

3. A lubrication device, comprising:

a circular cored column having a large flow path and an inner chamber defined therein; and a ring member located in said inner chamber of said circular cored column, said ring member having a semi-circular annular flow path defined about an outer periphery thereof, said annular flow path and said flow path of said cored circular column being in communication, wherein said ring member includes three jet flow conduits separated by approximately 120° annular intervals, each of said jet flow conduits having an inlet and an outlet, each inlet being in communication with said annular flow path such that a communication path is formed to allow fluid flowing through said large flow path in said circular cored column to enter said inlet of each jet flow conduit via said annular flow path and exit each jet flow conduit via each outlet.

4. The lubrication device defined by claim 3, wherein an inlet caliber of each jet flow conduit is 2.0 mm to 3.0 mm and an outlet caliber of said outlet of each jet flow conduit is 2.0 mm or less.

* * * * *